United States Patent
Tullis et al.

[15] 3,653,489
[45] Apr. 4, 1972

[54] POWER CONVEYOR SYSTEM FOR PRODUCTION LINES

[72] Inventors: Lyell C. Tullis, Janesville; Richard G. Moon, Beloit, both of Wis.

[73] Assignee: Giddings & Lewis, Inc., Fond du Lac, Wis.

[22] Filed: Dec. 22, 1969

[21] Appl. No.: 887,128

[52] U.S. Cl............................................198/110, 198/183
[51] Int. Cl..................................B65g 21/12, B65g 15/00
[58] Field of Search..........................................198/110, 183

[56] References Cited

UNITED STATES PATENTS

| | | | |
|---|---|---|---|
| 2,154,844 | 4/1939 | Harker et al. | 198/183 |
| 2,953,234 | 9/1960 | Abendschein | 198/183 X |
| 3,265,193 | 8/1966 | Bessant | 198/183 X |
| 3,373,860 | 3/1968 | Lindgren et al. | 198/183 X |
| 3,292,767 | 12/1966 | Lobdell et al. | 198/183 X |

*Primary Examiner*—Evon C. Blunk
*Assistant Examiner*—Hadd S. Lane
*Attorney*—Harold E. Stohlgren

[57] ABSTRACT

A continuously moving power conveyor for transferring workholding fixtures through a series of work performing stations in which the conveyor supports the fixtures so as to provide for cyclic or interrupted movement of the fixtures through some stations while providing positive and continuous feed of the fixtures through at least one of the stations or manual work areas.

1 Claims, 12 Drawing Figures

Patented April 4, 1972
3,653,489
6 Sheets-Sheet 1
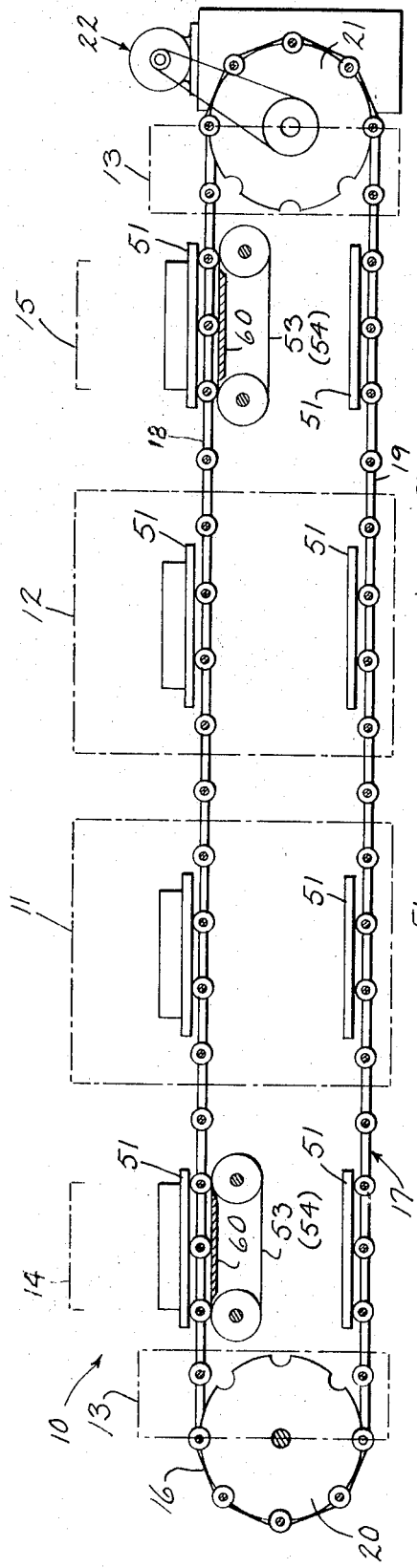
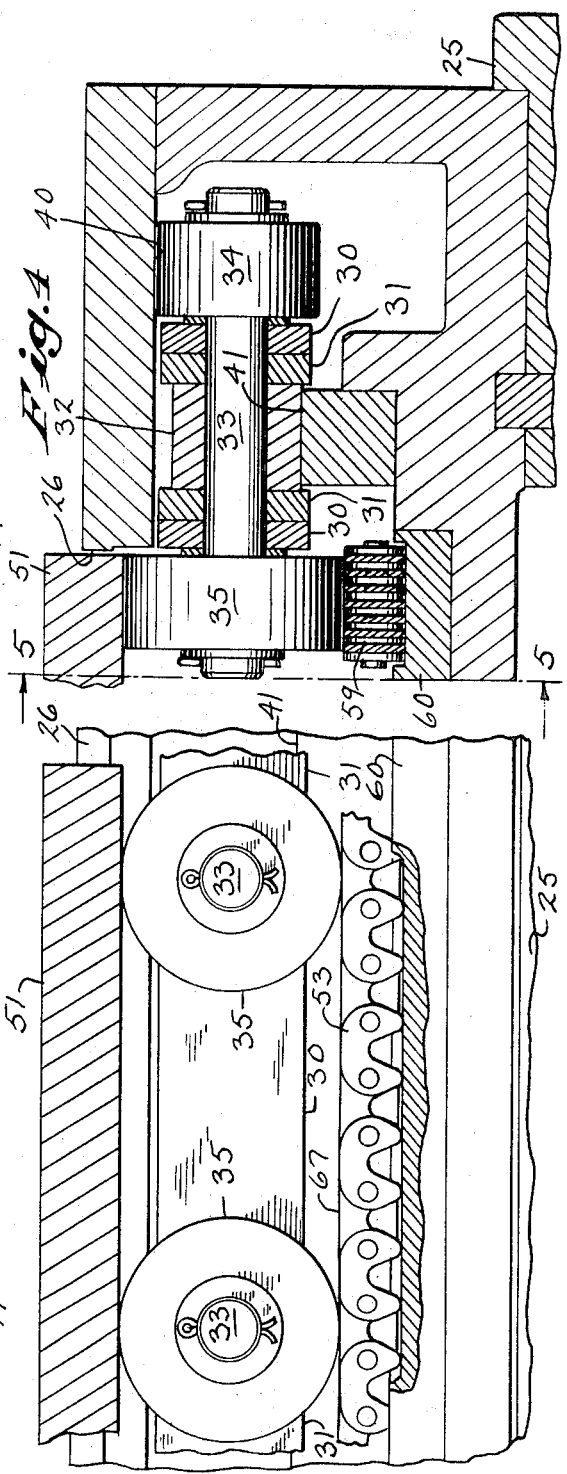
INVENTORS
LYELL C. TULLIS
RICHARD G. MOON
BY
HAROLD E. STOHLGREN
AGENT

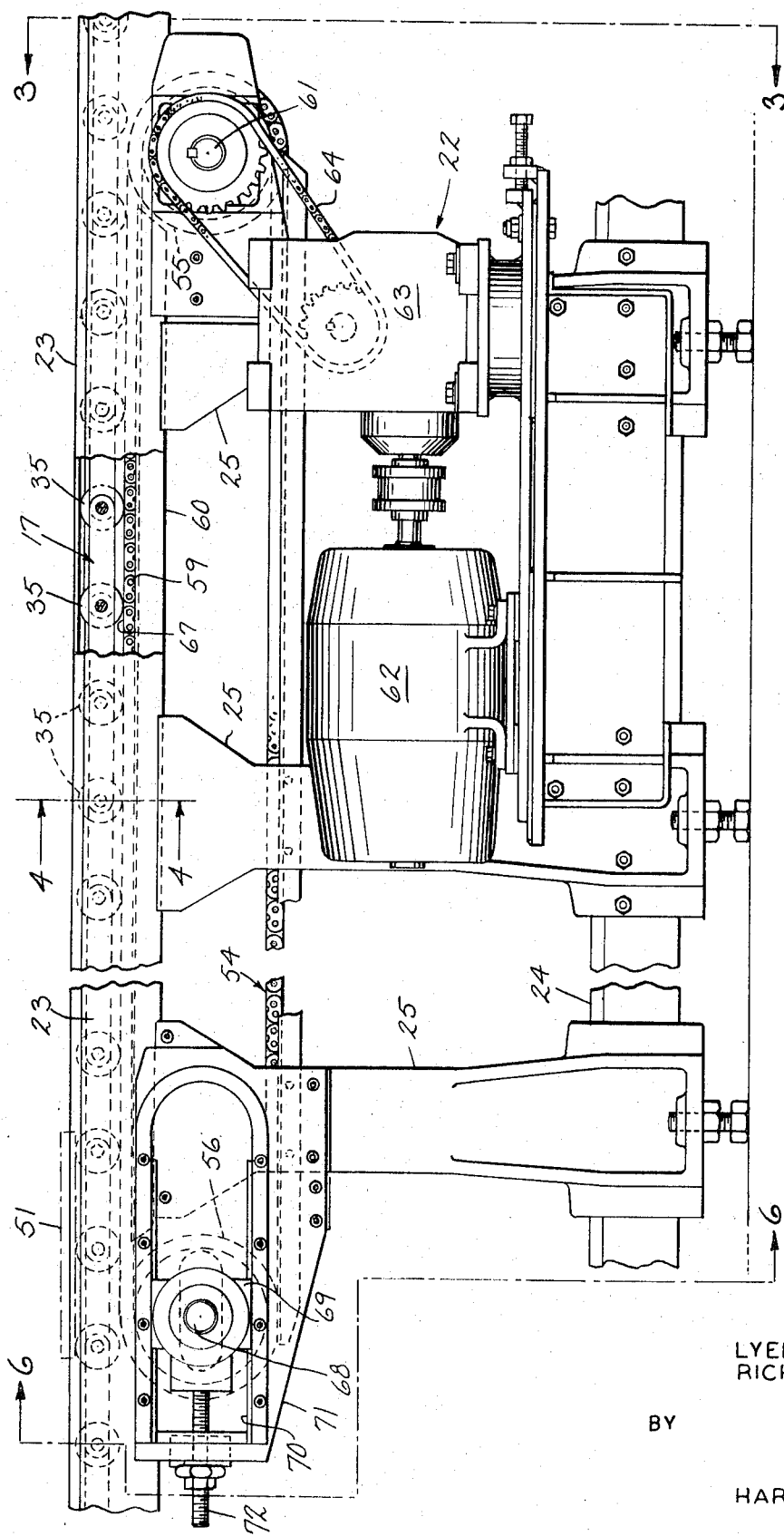

INVENTORS
LYELL C. TULLIS
RICHARD G. MOON

BY

HAROLD E. STOHLGREN
AGENT

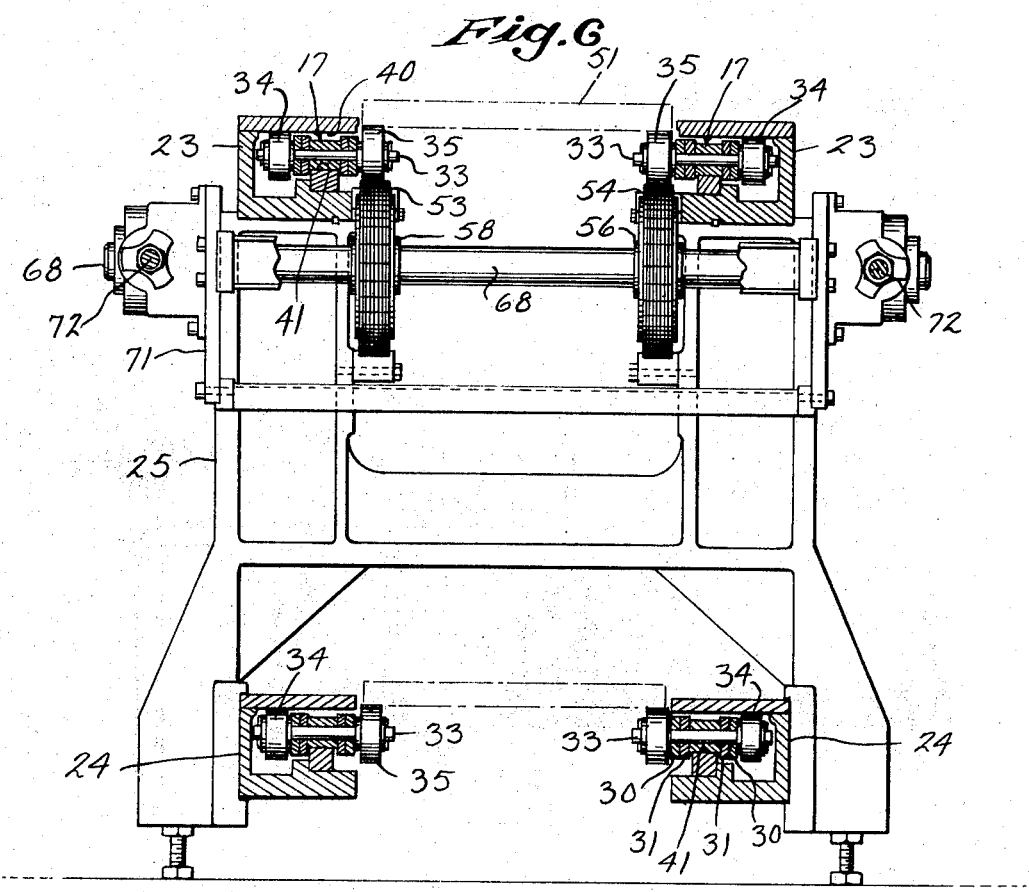
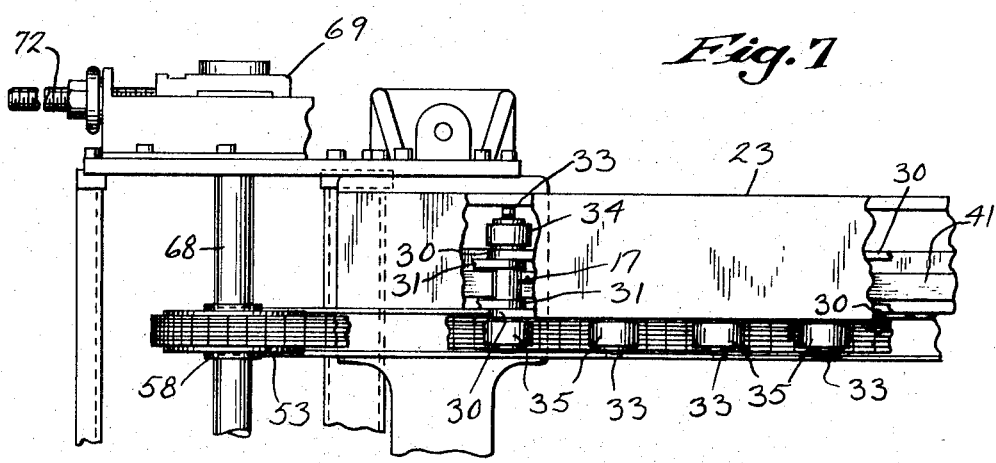

Patented April 4, 1972

INVENTORS
LYELL C. TULLIS
RICHARD G. MOON

BY

HAROLD E. STOHLGREN
AGENT

Patented April 4, 1972

INVENTORS
LYELL C. TULLIS
RICHARD G. MOON

BY

HAROLD E. STOHLGREN
AGENT

POWER CONVEYOR SYSTEM FOR PRODUCTION LINES

DESCRIPTION OF THE DISCLOSURE

This invention relates to conveyors used for moving work-holding fixtures and the like between stations of an inline production machine. The power and free type of conveyor to which this invention is particularly applicable is adapted to move the work along the conveyor at a constant speed equal to the speed of the powered conveyor chain. However, when the work fixture enters an operating station, the speed of the fixture can be slowed down or stopped relative to the conveyor chain to accommodate the cyclic requirement of the operating station.

Most production machines employing the power and free type conveyor system incorporate one or more stations at which manual operations are performed on the workpiece supported by the fixtures. The operations are performed by a human operator while the fixture moves through his station at the normal speed of the conveyor chain. In view of the fact that the fixtures are free to float or be held stationary relative to the conveyor chain by the application of slight external force on the fixture, it is possible for the human operator to physically adjust the speed of the fixtures through his station. The present invention is directed to a modified power and free type of conveyor system in which the free or floating feature of the conveyor is disabled at one or more of the manual operation stations.

With the above in mind, it is one object of the invention to provide a fixture conveyor system wherein the main conveyor chain is driven at a constant speed and the fixtures carried by the conveyor chain can move at a cyclic speed rate through automatic work stations and at a positive speed through work stations where manual operations are performed.

Another object of the invention is to provide a conveyor system for work-holding fixtures on at least one section of which the fixtures are moved at a fixed rate which is adjustable relative to the main conveyor chain.

Another object of the invention is to provide an auxilary drive for the fixture supporting rollers of a power and free conveyor system by which the normally free rollers are rotated to cause the fixture to move at a speed which may be different from that of the main conveyor chain.

A clear understanding of the invention can be obtained in which reference is made to the attached drawings wherein:

FIG. 1 is a schematic representation of a production line incorporating the present invention.

FIG. 2 is a partial side elevation view of a fixture conveyor system illustrating the conveyor structure at stations 14 and 15 of FIG. 1.

FIG. 4 is an enlarged partial transverse section view taken along the line 4—4 of FIG. 2.

FIG. 5 is an enlarged partial elevation view of the conveyor, partially in section taken along the line 5—5 of FIG. 4.

FIG. 6 is a vertical transverse section view of the conveyor taken along line 6—6 of FIG. 2.

FIG. 7 is a partial plan view of the take-up end of the auxilary fixture drive.

Figure 3:
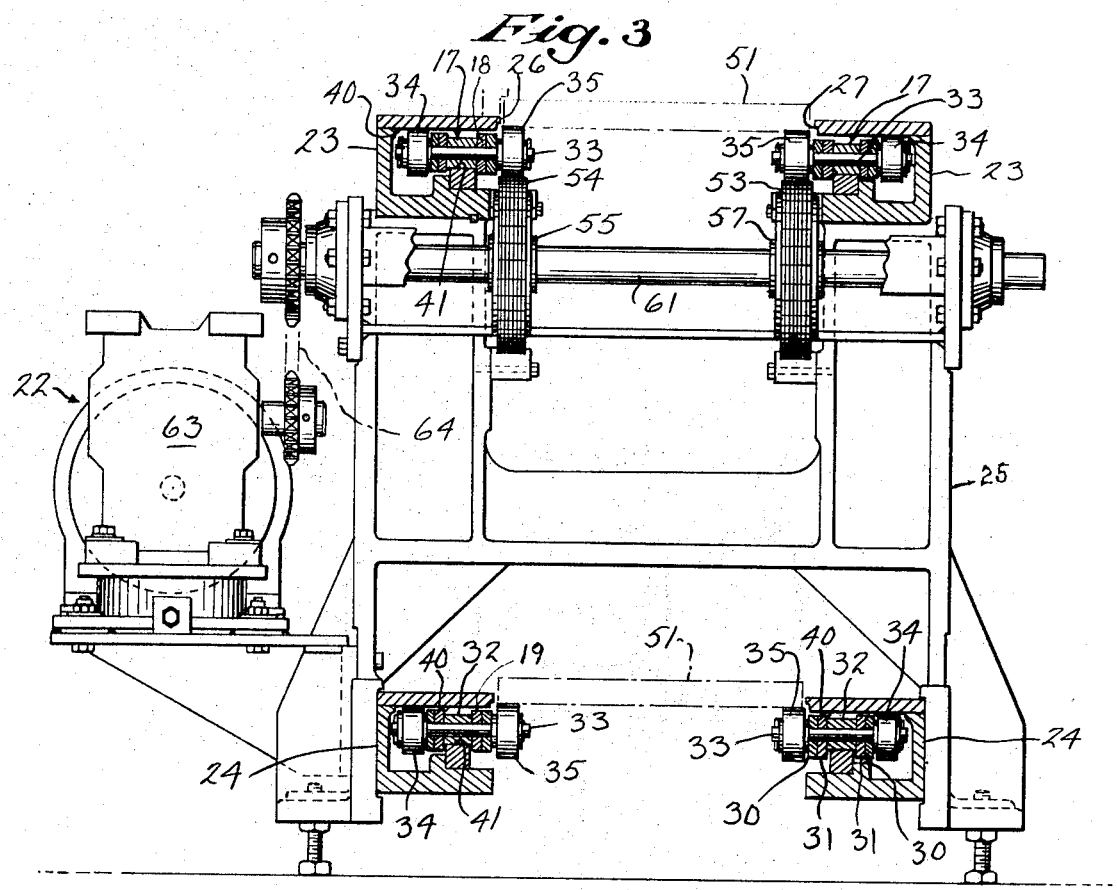
FIG. 3 is a vertical transverse section of the conveyor taken along the line 3—3 of FIG. 2.

Referring to the drawings and particularly to FIG. 1, the machine or production line 10 in which the present invention is incorporated includes automatic assembly stations 11-12, elevator stations 13 and manually attended areas or stations 14 and 15.

The several work stations are connected by a conveyor 16 consisting of a pair of conveyor chains 17 (FIGS. 2 and 3) each of which forms a closed loop including upper and lower horizontal sections 18 and 19 respectively joined by end sections which are carried over pairs of sprockets 20 and 21. The sprockets 21 are driven by a power transmission 22. The horizontal sections of the conveyor chain 18 and 19 are supported by tracks 23 and 24 respectively (FIGS. 2 and 3), which are supported in turn by spaced upstanding frames 25.

Each of the main conveyor chains 17 consists of pairs of parallel links 30 and 31 spaced apart by a roller 32 and joined by a connecting pin 33. Rollers 34 and 35 are carried on opposite outboard ends of each of the pins. The tracks 23 and 24 are formed with opposed horizontal surfaces 40 and 41. The roller 32 rides on the surface 41 and the outer roller 34 rides on the surface 40. Roller 35 is secured to the inner end of each of the pins 33 in cantilevered support fashion, see FIGS. 4 and 5.

The rollers 35 of the chain 17 are adapted to support a series of work-holding fixtures 51. The fixtures are normally carried along the conveyor at the same speed as the conveyor chain since there is sufficient friction between the support rollers 35 and pins 33 to prevent rotation about their axes.

The tracks 23 and 24 include vertical surfaces 26 and 27 respectively, which serve to guide the fixtures in alignment with the conveyor chain.

As indicated in FIG. 1, an elevator mechanism 13 adjoins each of the opposite ends of the conveyor 16 for the purpose of transferring the fixtures between the upper and lower track sections of the conveyor so as to provide for continuous automatic circulation of the fixtures.

When a fixture arrives at any one of the automatic stations 11 and 12, it is momentarily stopped by an abutment locating device, not shown. The conveyor chains 17, however, keep moving at a preset speed. The rollers 35 are free to rotate on the pins 33 so they merely roll along the underside of the stalled fixture as a result of frictional contact therewith. If succeeding fixtures arrive at the same automatic operating station while that station is still occupied with a fixture, they will be stopped by an escapement device, not shown. As already mentioned, the roller 35 will travel along the underside of the stalled succeeding fixtures. Then when the station is clear, the next fixture will be carried into position by the chain conveyor.

Manually operated stations such as 14 and 15 could, by way it example, involve loading and unloading of the work part from the fixture. The present invention serves to provide power feed of the fixture through such manually operated stations. At such stations a human operator performs the manual operation on the work part as it moves along the line at a preset speed. Normally the operator can perform the manual function on the part as it moves past him without bodily shifting his position. Manual operations such as loading or unloading of the work part or component are normally of a nature that they can be performed by the operator with plenty of time to spare. The advantage of the power feed through the manual station is that is requires factory personnel to be provided at the manual station at all times in sufficient numbers to accomplish the manual operation, so that the rated capacity of the line is maintained.

To accomplish the above described feature, each section of the line at which a manual operation is performed is provided with a power drive for rotating the normally free fixture support rollers 35. To that end, and referring to FIGS. 1-8, a pair of looped belts 53 and 54 are supported by pairs of sprockets 55, 56, and 57, 58 respectively. Each belt has an upper horizontal section 59 supported and guided by a track 60 attached to each of the conveyor tracks 23 and 24. The section 59 is disposed beneath and in vertical alignment with the rollers 35. The sprockets 55 and 57 located at one end of the chain are supported on a shaft 61 journaled in the conveyor frame. The shaft is driven by a motor 62 operating through reduction unit 63 and a chain drive 64. The speed of the belts 53 and 54 may either be fixed or adjustable depending upon the design of the drive units selected.

As the rollers 35 of the main conveyor approach the manual station, they are picked up and ride upon the top surface 67 of the upper section 59 of the chain. At this point the rollers are no longer free to rotate under conditions that would allow the fixture to float or slow down due to a resistance such as a human hand. Instead, the rollers 35 are now power driven about their own axes by reason of their frictional contact with the belts 53 and 54. If the belts move at the same speed as the main conveyor chain, then the rollers will not rotate relative to their own axes and the fixture will merely move with the conveyor at its normal speed but with positive drive action. If the drive motor 62 is set up to move the belt 53 and 54 at a faster rate than the main conveyor chain, then the rollers will be rotated counterclockwise about their axes causing the fixture to move at a slower rate than the main chain. It should be noted that the fixture is no longer free floating. Instead, it is positively driven through the station to the extent that the frictional driving forces between the roller and top of the roller and between the belt and bottom of the roller are not overcome by some external force. After leaving the area of the belts 53 and 54, the fixtures again are carried along the conveyor under power and free conditions to accommodate succeeding automatic operations.

FIGS. 2, 6 and 7 illustrate a slack take-up for the belts 53 and 54. For that purpose the sprockets 56 and 58 are supported on a shaft 68. The shaft 68 is supported in pillow blocks 69 adjustably carried in guideways 70 formed in an extension 71 of one of the frames 25. Each of the pillow blocks has an associated screw and nut assembly 72 which provides for adjustment of the blocks along the slide to provide the necessary tension on the belts.

Figure 8:
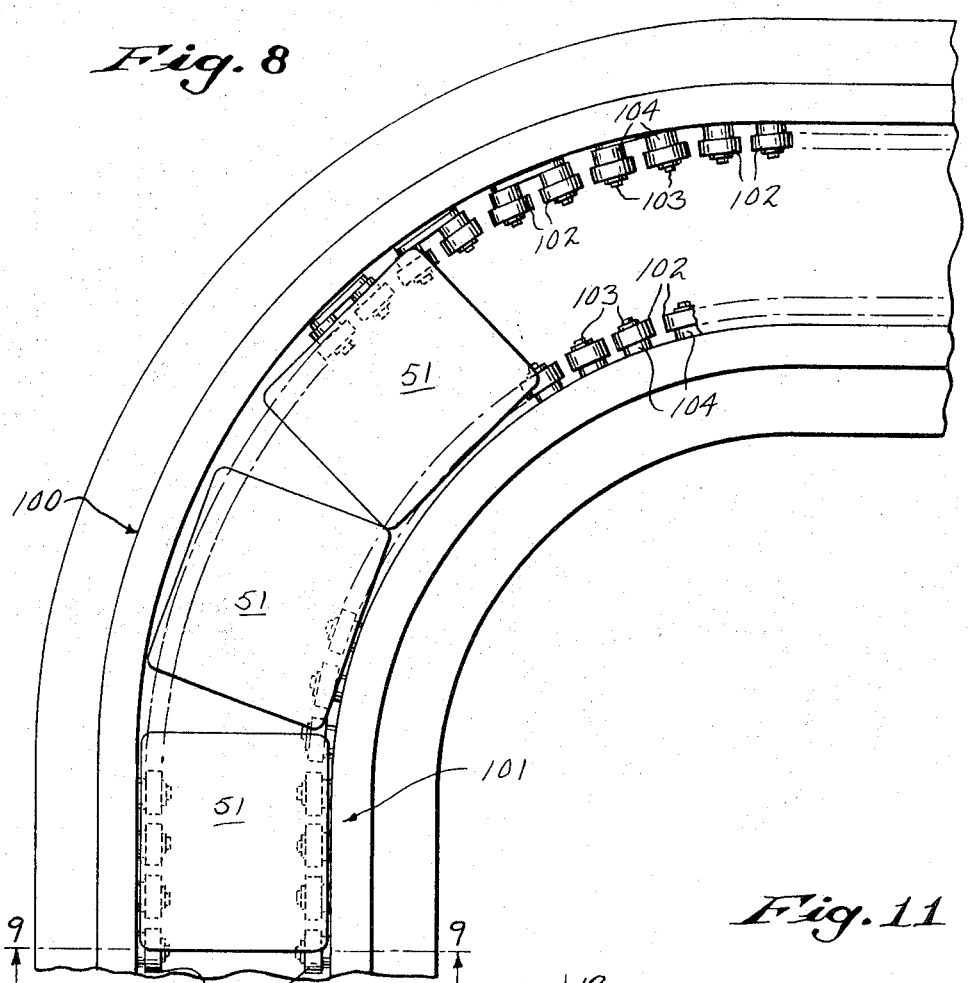
FIG. 8 is a partial plan view of a modified power and free conveyor of the carrousel type to which the invention is applicable.
Figure 9:
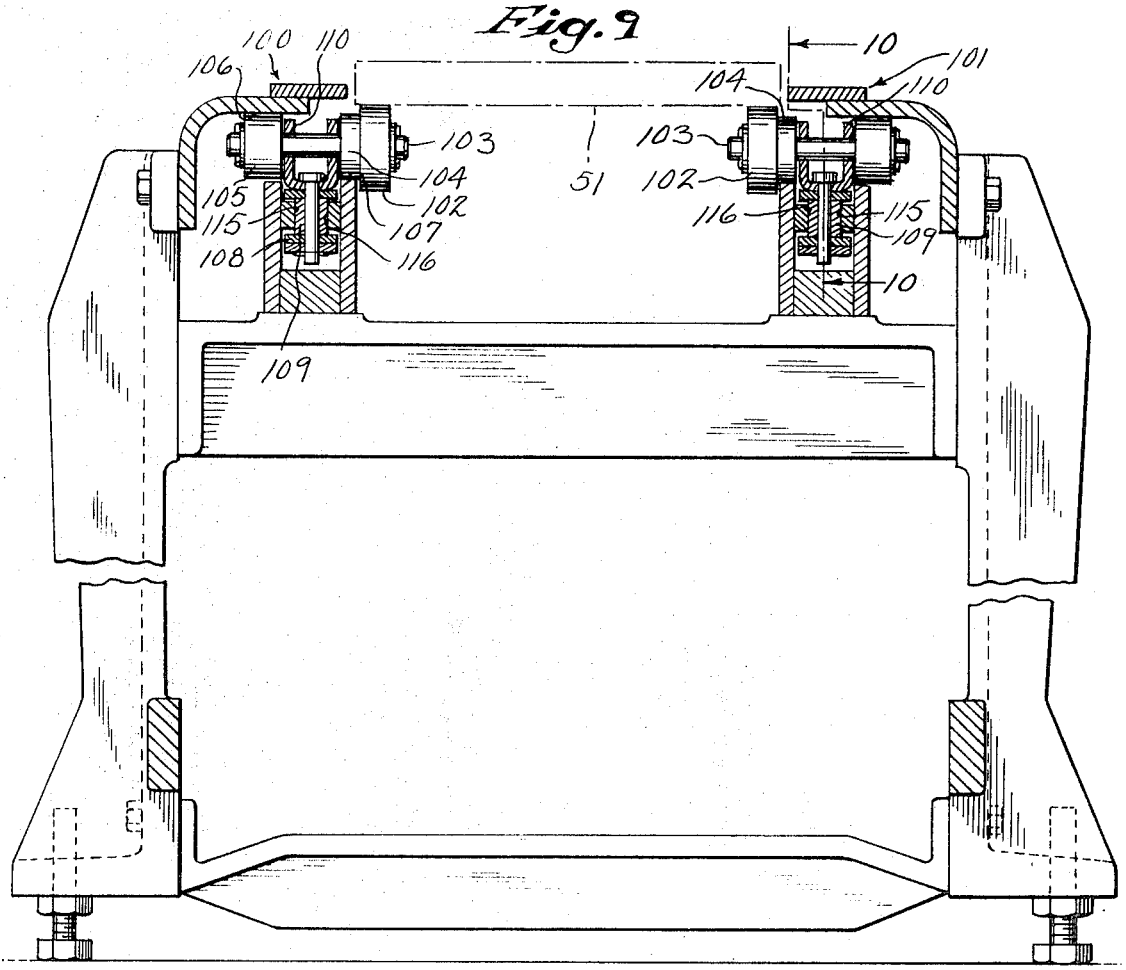
FIG. 9 is a vertical section view taken along the line 9—9 of FIG. 8.
Figure 10:
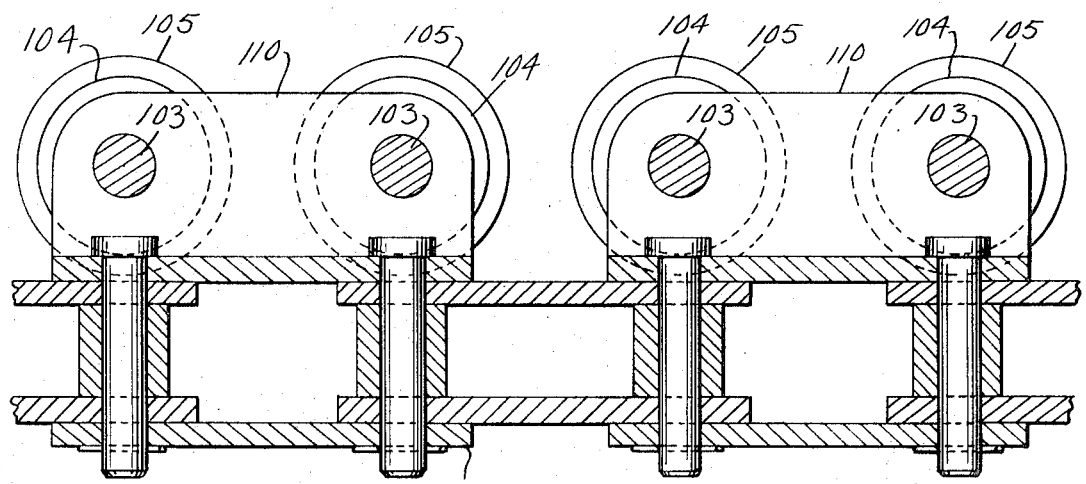
FIG. 10 is an elevation view of the conveyor chain taken along the line 10—10 of FIG. 9.

FIGS. 8–11 disclose modified power and free conveyor structures. The power pacer feature previously described is applicable to these conveyors. Referring particularly to FIGS. 8 and 9, the two tracks 100 and 101 form closed parallel loops lying in a horizontal plane. Such an arrangement is sometimes referred to as a carrousel since the work fixtures circulate around the loop without the need of the elevators previously mentioned. The fixture supporting rollers 102 are carried on one end of pins 103. Rollers 104 and 105, also carried on each of the pins are adapted to be supported in their rolling movements by opposed track surfaces 106 and 107 respectively. Closed loop chains 108 and 109 are supported with the track 100 and 101 respectively for guided movement therein. In the modification of FIG. 9 and 10, the pins 103 are joined to the chains 108 and 109 in pairs by a U-shaped yoke 110 through which the pins 103 project and which also serves as connecting link in the chains 108 and 109. As before, the work fixture 51 is supported on the rollers 102 and is guided in its movement thereon by track guide surfaces 115 and 116. The power driven belts 53 and 54 of FIGS. 1–7 are also applicable to drive the roller 102 of FIGS. 8–12.

Figure 12:
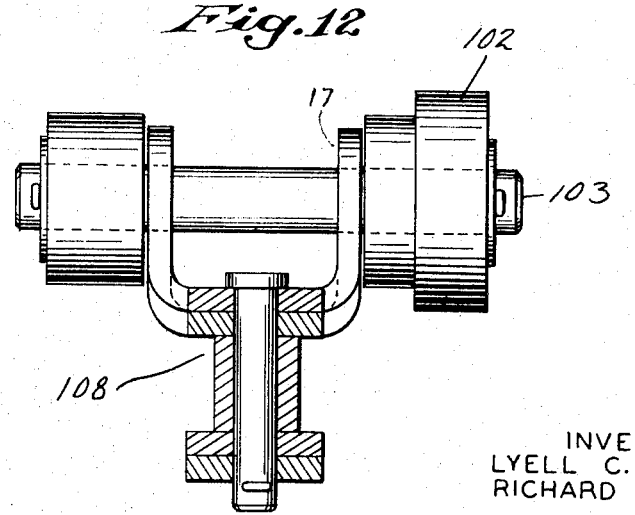
FIGS. 11 and 12 are elevation and vertical section views respectively of a modified chain construction used in a carrousel power and free type conveyor system of FIGS. 8 and 9.
Figure 11:
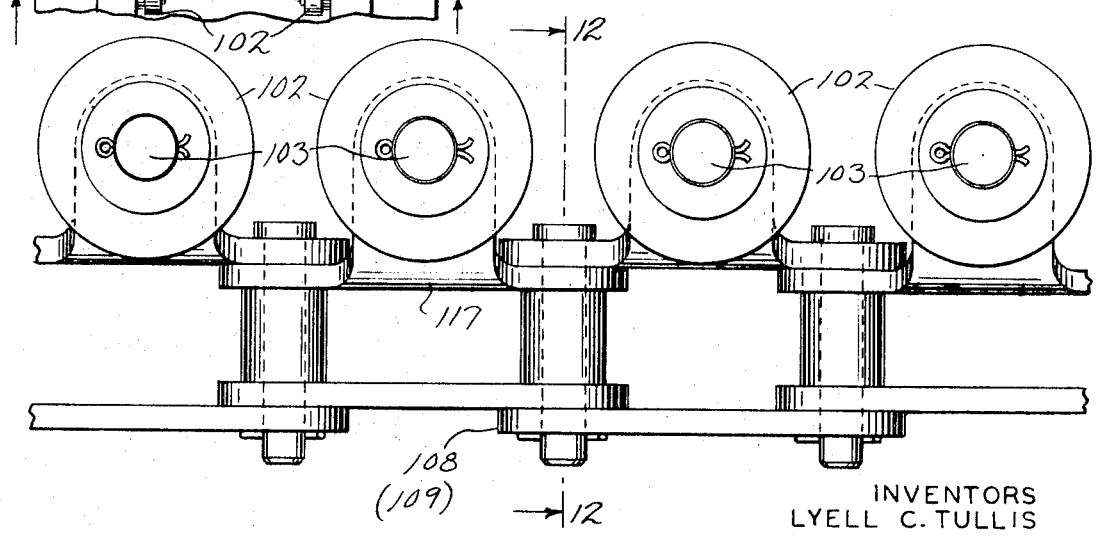

The modification represented by FIGS. 11 and 12 shows each of the pins 103 supported individually by successive yokes 117 extending upwardly from the chains 108 and 109.

It is contemplated that various modifications and changes may be made in the conveyor system of the present invention within the scope of the appended claims, without departing from the spirit of the invention.

I claim as my invention:

1. A power and free conveyor system for moving work holding fixtures along a production line having both automatic and manually attended work stations comprising; spaced parallel tracks each formed with fixed supporting and stabilizing surfaces, a conveyor chain supported and stabilized by each of the tracks on their respective fixed supporting and stabilizing surfaces, inwardly projecting rotatably free rollers having a length substantially shorter than half the spacing between the tracks and supported independently by respective ones of the chains leaving uninterrupted space between the chains to accommodate the work stations, power means for driving the chains along the tracks, work holding fixtures supported on the rollers for movement at speed rates automatically adjustable relative to the speed of the chain to meet the work cycle requirements of the automatic work station, a pair of belts disposed below the rollers in longitudinal and vertical alignment with the rollers to frictionally engage the rollers in the area of the manually attended work station and means to drive the belts at a preset speed rate to move the work holding fixtures through the manually attended station at a speed rate which is dependent on the relative velocities of the belts and the conveyor chains.

* * * * *